United States Patent [19]

Ligorati et al.

[11] 4,142,990

[45] Mar. 6, 1979

[54] ZIEGLER CATALYSTS

[75] Inventors: Ferdinando Ligorati, Usmate; Renzo Invernizzi; Carlo Collu, both of Milan; Maurizio Fontanesi, Concorezzo, all of Italy

[73] Assignee: EUTECO S.p.A., Milan, Italy

[21] Appl. No.: 840,184

[22] Filed: Oct. 6, 1977

[30] Foreign Application Priority Data

Oct. 19, 1976 [IT] Italy ........................ 28520 A/76

[51] Int. Cl.² .......................... C08F 4/02; C08F 4/64
[52] U.S. Cl. ................................ 252/429 C; 252/430; 526/129; 526/156
[58] Field of Search ........................ 252/429 C, 430

[56] References Cited

U.S. PATENT DOCUMENTS

| | | | |
|---|---|---|---|
| 2,967,185 | 1/1961 | Becker et al. | 252/430 X |
| 3,054,754 | 9/1962 | Lasky | 252/429 C |
| 3,072,633 | 1/1963 | Cawthon et al. | 252/429 C X |
| 3,166,542 | 1/1965 | Orzechowski et al. | 252/429 C X |
| 3,400,084 | 9/1968 | Fukumoto et al. | 252/429 C |
| 3,705,886 | 12/1972 | Kashiwa et al. | 252/429 C X |
| 3,978,031 | 8/1976 | Reginato et al. | 252/429 C X |

*Primary Examiner*—Patrick Garvin
*Attorney, Agent, or Firm*—Sughrue, Rothwell, Mion, Zinn and Macpeak

[57] ABSTRACT

Ziegler catalytic system comprising an organo-metallic compound of a metal of Groups I to III of the Periodic Table and a compound of a heavy metal of Groups IV to VI supported on a carrier, the latter being an activated amorphous alumina or alumino-silicate containing from 0.3 to 30% by weight of salts of aluminum with oxygenated inorganic anions, or of a mixture of the latter with salts of aluminum with non-oxygenated inorganic anions, said inorganic anions being introduced into the amorphous alumina or alumino-silicate by contacting the latter with one or more acid solutions of the inorganic anions and the carrier being then activated by calcination at 250° – 700° C.

8 Claims, No Drawings

ZIEGLER CATALYSTS

The present invention relates to Ziegler catalysts for use in the homo- and copolymerization of olefines by means of processes which use low reaction pressures.

It has been known for some time that olefines can be polymerized by means of a low pressure process by resorting to the use of Ziegler catalysts. The catalysts used are obtained by reacting one or more compounds of a transition element belonging to the Groups IV to VI of the Periodic System with an activator formed by one or more organo-metallic compounds of elements belonging to the Groups I to III of the Periodic System. The process is generally carried out in suspension, solution or in the gaseous phase.

Subsequently, processes have been discovered in which the components of the catalyst are used in combination with a support.

For instance, according to the French Pat. No. 1,198,422, compounds of metals belonging to Groups IV to VI of the Periodic System are fixed on supports such as bentonite, pumice, silica gel and calcium phosphate, and are then activated by reduction with organo-aluminum compounds. According to this patent, the polymerization proceeds independently of the composition of the support. Therefore, the only important factor is the composition of the catalyst fixed to the support. Moreover, a great disadvantage is formed by the necessity of removing catalytic residues and the support from the polymer produced before the latter can be used.

Many subsequent patents relate to the use of supports which also play an active role in the catalysts; the nature and composition of these supports must be specific and exactly determined.

For example, the Belgian Pat. No. 609,261 uses phosphates of alkaline earth metals. However, these must be heated even up to 1000° C. before they can be made to react with titanium or vanadium compounds, in order to acquire sufficient polymerization catalytic activity. In spite of this the yields of the polymer which are obtained are very low.

A series of other patents relates to the use of alumina supports. Generally the latter are prepared from various hydrated mineral aluminas, which are then calcined to obtain the final anhydrous, crystalline aluminas, characterized by well defined and critical properties.

For example, the German Pat. No. 1,214,653 claims a process for preparing supported catalysts in which certain compounds of heavy metals from Groups IV to VIII of the Periodic System are made to react with, for example, a pyrogenic alumina support, the surface of which contains hydroxyl groups. The average size of the particles of the support must be less than 0.1 microns and the concentration of hydroxyl groups must be sufficiently high for these to be able to react with at least 1 $\times 10^{-4}$ equivalents of the transition metal per gram of support.

Moreover, the polymerization yields are so low, even when the pressures are raised to 190 atmospheres, that it is essential to purify the polymers obtained of the catalyst and the support.

It is also very difficult to obtain the alumina by other ways. For example, in the French Pat. No. 1,516,139 the alumina to be used as a support is made by preparing sodium aluminate by reaction between aluminium and soda and treating a solution of this aluminate with gaseous carbon dioxide until hydrated crystalline alumina is obtained, which is washed and dried at 120° C. The bayerite thus obtained is then calcined at 500° C. Likewise in this case, apart from the difficulties of the various stages of preparation of the support, the polymerization yields are not very high.

Finally, in the German patent application publication No. 2035943 a description is given of a support which is a blend of a metallic oxide with a halide of a trivalent metal, for example, alumina and aluminium trichloride. However, this support is a mechanical blend obtained, for example, by mixing in a ball mill, and the productivity and specific activity of catalysts based on such supports are rather low.

We have now surprisingly found that improved results can be obtained by using a support consisting of an alumina or an alumino-silicate of particular, excellent properties, which contains, in an intimate mixture, inorganic anions which increase and synergize its activity as a catalytic constituent to a very high degree.

Thus, the invention provides a Ziegler catalytic system formed by the combination of an organo-metallic compound of a metal of Group I, II or III of the Periodic System of the Elements according to Mendeleef and a compound of a heavy metal of Group IV, V or VI of said Periodic System supported on a carrier, said carrier being an activated amorphous alumina or alumino-silicate containing from 0.3 to 30% by weight of one or more salts of aluminum with oxygenated inorganic anions or of a mixture of the latter with one or more salts of aluminum with non-oxygenated inorganic anions, said inorganic anions being introduced into the amorphous alumina or alumino-silicate by contacting the latter with one or more acid solutions of said inorganic anions and said alumina or alumino-silicate being then activated by calcination at a temperature of from 250° to 700° C.

According to another aspect of the invention then is provided a process for the homo- or co-polymerization of olefins having from 2 to 10 carbon atoms per molecule, in which said homo- or co-polymerization is carried out by the low pressure Ziegler method in the presence of the above catalytic system.

The preferred oxygenated inorganic anions are the sulphate, phosphate, chlorate, perchlorate and halogen-sulphonate anions.

The preferred non-oxygenated inorganic anions are the halogen anions.

The supports used in the catalyst of the invention may be prepared in a simple manner even from commercial aluminas or alumino-silicates provided these are substantially amorphous. A typical example of amorphous alumina is the pseudo-boehmite.

The aforementioned aluminas or alumino-silicates are contacted with a suitable acid, that is to say, one which contains the preselected anion. This acid is generally used in solution, usually aqueous solution. A wide range of concentrations may be used, bearing in mind that in some cases the use of excessively high concentrations or possibly the use of an acid in its pure state, may cause an over intense attach on the support or even its possible disintegration, especially if the average size of its particles is extremely small. At any rate, the pH range of the acid solutions which can be used is very extensive, and some acids can even be used in the pure state.

The range of temperatures usable during the contact is also very wide. In general however, it is pereferable to operate at room temperature, even though temperatures of up to 150° C. do not result in any considerable variations in the activity of the support.

The grain size of the particles used as the support is not a critical factor. However, it is preferable to use particles having an average size of from 20 to 400 microns, and preferably from 40 to 200 microns. In fact, granules of smaller size may subsequently disintegrate excessively, or even dissolve, during the contacting with the acid or even during the subsequent reaction stage with the polymerization catalyst.

In the case in which it is desired to introduce a mixture of inorganic anions into the support these can be added to the alumina or to the alumino-silicate by acid reactions effected simultaneously or in successive stages with intervals for drying or possibly calcination of the support. For example the sulphate anion may be introduced by reaction of the support with a solution of sulphuric acid and then, after drying of the support to open up any of its pores which may have been closed by this acid reaction, the second anion can be introduced by means of another reaction with a solution of the desired acid.

In every case, after the final acid reaction, the support must be subjected to a thermal activation treatment. This treatment serves to remove the water absorbed by the support and to limit the number of hydroxyl groups present in it, which in too high a quantity could hydrolyze the polymerization catalyst.

The conditions in which this calcination operation is effected are not very critical, neither with regard to the duration nor the pressure, nor the gaseous atmosphere in which calcination is carried out.

The calcination temperature may vary within a relatively wide range of values, normally from 250° to 700° C. As a heating temperature gradient to reach the calcination temperatures, that of 50° C./h may, for example, be chosen.

The support has, after calcination, an inorganic anion content of from 0.2 to 25% by weight, and preferably from 1.5 to 15% by weight.

Moreover, the aforementioned support has, as already mentioned, the particular, important characteristic of being amorphous.

Amorphous supports prove to be much more efficient and active than similar supports having a high degree of crystallinity.

Other characteristics are, however, substantially identical to those of the aluminas and alumino-silicates already described in the technical literature.

The volume of the pores is generally from 0.4 to 2 ml/g, and preferably from 1.2 to 2 ml/g. The surface area is generally from 100 to 400 m²/g, and preferably from 200 to 300 m²/g. The bulk density (non-compacted product) is generally from 0.2 to 0.8 g/ml, and preferably from 0.2 to 0.4 g/ml.

In the preparation of the catalytic system of the invention the alumina or alumino-silicate support is first reacted with a compound of a heavy metal of Group IV to VI of he Periodic System. This compound is preferably a compound of titanium, vanadium or chromium. Generally, the best results are obtained with titanium compounds.

The aforementioned compounds can be of various types, such as halides, oxyhalides and alkoxyhalides. The best results are obtained with $TiCl_4$.

The operation conditions used for reacting the support with the aforementioned compound are not critical. For example, the aforementioned compound may be used in the gaseous or the vapour state, either pure or diluted with an inert gas; alternatively, it can be used in the liquid state or in solution. As solvents, the hydrocarbon solvents conventionally used for the low pressure polymerization of olefines can generally be used.

Preferably, the support is suspended in the aforesaid pure compound in the liquid state, or the support is washed with the aforesaid compound, likewise in pure form and in the liquid state.

The temperature and pressure of the reaction are not critical factors. For example, the reaction may be carried out at atmospheric pressure and at temperatures of between 50° and 130° C., and preferably between 100° and 130° C. The contact time between the alumina or alumino-silicate support and the aforesaid compound is generally from 0.5 to 5 hours, and preferably from 1 to 2 hours.

The reaction product (catalytic component) is conveniently washed, first with the compound of the heavy metal which was used in the reaction, and subsequently with an inert hydrocarbon solvent, in order to remove the excess of heavy metal compound which has not been fixed to the support.

The ultimate analysis carried out on the resulting catalytic component, after washing, shows that the heavy metal content is generally from 0.4 to 3% by weight with respect to the support.

The catalytic system, in accordance with the present invention, also includes, and already stated hereabove, an organo-metallic compound of a metal of Group I to III of the Periodic System: for example, a compound of lithium, magnesium, aluminum or zinc. The best results are obtained with an alkyl-aluminum and with alkyl-aluminum halides, such as trimethylaluminum, triethylaluminum, tri-isobutylaluminum, diethylaluminum monochloride and monoethylaluminum dichloride. The best results are obtained with triethylaluminum and with tri-isobutylaluminum.

The catalyst of this invention is applicable to the homo- and copolymerization of olefines containing from 2 to 10 carbon atoms per molecule; for example, ethylene, propylene, 1-butene, 1-pentene, 1-hexene and 4-methyl-1-pentene. It proves to be particularly advantageous when used for the preparation of ethylene homo- or copolymers.

The homo- and co-polymerization of olefines can be effected by any of the conventional methods, either in the gaseous phase or in solution. In the latter case use is made of inert solvents, preferably aliphatic or cycloaliphatic hydrocarbons such as butane, pentane, hexane, heptane, cyclo-hexane, alone or mixed with one another.

The pressure adopted for the polymerization is generally from atmospheric pressure to about 50 Kg/cm². The temperature usually adopted is from 40° to 170° C., preferably from about 80° to 130° C.

The organo-metallic compound and the aforesaid catalytic component may be introduced into the polymerization reactor separately or they can be previously reacted by first placing them in contact with one another, generally for a period of from 15 to 120 minutes.

The quantity of organo-metallic compound used is not critical; however, preferably, this compound should be present in molar excess with respect to the heavy metal of Group IV to VI of the Periodic System present on the support. For example, as an indication, in the case of a catalyst prepared from triethylaluminium and $TiCl_4$, from 10 to 30 moles of alkylaluminium may be used for each gram atom of Ti.

The quantity of the catalytic component, obtained by reaction of the support with the compound of a heavy metal of Group IV to VI of the Periodic System, may vary within a wide range in dependence on the parameters selected for the polymerization and also on the characteristics (for example: molecular weight) which it is desired to obtain in the polymer. Moreover, this quantity is determined by taking into account the quantity of the heavy metal contained in the support. For example, as an indication, the said catalytic component may be used in an amount of from 50 to 400 mg/liter of reaction solvent, for polymerization in solution.

In the polymerization process it is, moreover, possible to control the molecular weight of the homo- or copolymers produced by adding to the polymerization medium one or more chain-terminating agents. The use of hydrogen is preferred but other agents such as diethylzinc and diethylcadmium, may also be used.

The catalyst of the present invention shows a very high productivity and specific activity in the homo- and co-polymerization of olefines.

For example, in the case of the homo-polymerization of ethylene productivity values of 1500 g of polyethylene/g catalyst/h are exceeded. By using titanium catalysts specific activities have been reached exceeding 100 Kg (and in certain cases even 200 Kg) of polyethylene/g titanium/h. Consequently, the concentration of harmful catalytic residues in the polymers produced is negligible. Therefore the long and costly purification operations of the polymers produced can be avoided and the latter can be used as they are.

Purely by way of an illustration a few examples are given hereafter. These must in no way be considered as a limitation of the invention.

EXAMPLE 1

20 g of a commercial morphous alumina, having a pore volume of 0.4 ml/g and an amount of bound water equal to 16% by weight, are admixed with 6 ml of a 1 N aqueous solution of sulphuric acid, over a period of 15 minutes, under vigorous agitation and at room temperature.

The impregnated alumina is dried for 6 hours at 120° C., and then subjected to a calcination treatment by heating it, with a heating temperature gradient of 50° C./h up to 700°, and keeping it at this temperature for 6 hours.

The support thus obtained contains 3.3% by weight of $SO_4^{--}$ anions.

50g of this alumina support are treated with 50 ml of pure liquid $TiCl_4$, at boiling temperature, under agitation, for one hour. The solid reaction product is separated, washed with a further quantity of 50 ml of fresh $TiCl_4$ and subsequently, five times, with anhydrous n-heptane until the free chlorine ions have completely disappeared from the washing solvent, and then dried.

The catalytic component thus prepared has a titanium content equal to 0.84% by weight with respect to the support.

The polymerization is then carried out in the following manner:

0.15 g of the above catalytic component are suspended in 1500 ml of anhydrous n-heptane; 0.25 g of triisobutylaluminum are then added. A catalytic complex is formed which is left to mature for 30 minutes.

The whole suspension is then transferred to a 3 liter autoclave, fitted with an agitator.

Hydrogen and ethylene are introduced in amounts corresponding to 2 atmospheres of hydrogen and 2 atmospheres of ethylene and the autoclave is then heated up to a temperature of 80° C., which is kept constant for the whole duration of the polymerization.

At this temperature the total pressure is raised, by feeding in ethylene, to 6 atmospheres and this value is maintained, during the whole duration of polymerization, by means of the continuous feeding of fresh ethylene.

After 1 hour the autoclave is voided of gas, cooled, and the polymer produced, which is in granular form, is filtered.

After drying 234g of polyethylene are obtained which corresponds to a productivity of 1555 g of polyethylene/g catalyst/h.

The specific activity of the catalytic component, with reference to the quantity of titanium used, is 185.1 kg of polyethylene/g titanium/h.

EXAMPLE 2

10 g of a commercial amorphous alumino-silicate, containing 25% by weight of alumina and 5% of $H_2O$ are treated at room temperature with 10 ml of an aqueous 10% by weight/volume solution of $H_3PO_4$. The alumino-silicate is then dried for 6 hours at 120° C. and calcined for 12 hours at 450° C.

The support thus obtained contains 8.7 wt.% of $PO_4^{---}$ anions.

The preparation of the catalytic component, by means of the impregnation of the support with $TiCl_4$, is effected as in Example 1.

The catalytic component thus prepared has a titanium content equal to 1.5% by weight with respect to the support.

The preparation of the catalytic system and the polymerization of the ethylene are then effected as in Example 1.

The productiviy is 1700 g of polyethylene/g catalyst/h; the specific activity of the catalytic component is 113.3 Kg of polyethylene/g titanium/h.

EXAMPLE 3

20 g of alumina identical to that used in Example 1 are treated at room temperature with 18 ml of an aqueous 1.0% by weight solution of $HClO_4$. The alumina is then dried and calcined as in Example 1.

The support thus obtained has a $ClO_4^-$ anion content of 1.06% by weight.

5 g of the aforesaid support are treated with 100 ml of pure liquid $VOCl_3$, at a temperature of 80° C. for 2 hours, under vigorous agitation. The solid reaction product is filtered and washed, first with 50 ml of pure $VOCl_3$ still at 80° C., and then several times with 50 ml portions of anhydrous cyclohexane, until the $VOCl_3$ has completely disappeared in the hydrocarbon used for washing.

The catalytic component thus prepared has a vanadium content of 1.3% by weight with respect to the support.

50 mg of the aforesaid catalytic component are suspended in 200 ml of anhydrous cyclohexane and 200 mg of triethylaluminum are then added.

After a period of maturing of 30 minutes all the suspension is transferred into an autoclave fitted with an agitator. The polymerization of the ethylene is then carried out under the same conditions as used in Example 1, for a period of 1 hour.

145 g of polymer are obtained. The productivity is 2900 g of polyethylene/g catalyst/h; the specific activity of the catalytic component is 241.6 Kg of polyethylene/g vanadium/h.

EXAMPLE 4

10 g of amorphous alumina having a bound water content equal to 28% by weight and a pore volume of 1.2 ml/g are treated at room temperature with 12 ml of an aqueous 1N solution of sulphuric acid.

At the end of the treatment the alumina is dried for 6 hours at a temperature of 120° C. to restore its pore volume; it is then treated, again at room temperature, with 10 ml of an aqueous 10% by weight solution of hydrofluoric acid.

The treated alumina is again dried for 6 hours at 120° C. and then raised to a temperature of 600° C. over 12 hours, at which temperature it is calcined for 6 hours.

The support thus obtained contains 11.55% by weight of $SO_4^{--}$ anions and 1.05% by weight of $F^-$ anions.

The preparation of the catalytic component, by means of the impregnation of the support with $TiCl_4$, is effected as in Example 1.

The catalytic component thus prepared has a titanium content equal to 0.6% by weight with respect to the support.

The preparation of the catalytic system and the polymerization of the ethylene are then effected as in Example 1.

The productivity is 1700 g of polyethylene/g catalyst/h; the specific activity of the catalytic component is 283 Kg of polyethylene/g titanium/h.

EXAMPLE 5

50 g of amorphous alumina in microspheroidal form, with a pore volume of 1.3 ml/g and containing 28% by weight of bound water, are loaded into a 1 inch diameter tube provided with a porous baffle as a support for the solid mass introduced. The tube is connected to a Drechsel bottle containing an aqueous 35.5% by weight solution of hydrofluoric acid and the Drechsel bottle is connected to a source of nitrogen.

5 normal liters/h of nitrogen are made to pass through tthe Drechsel bottle to vaporize the solution, and the resulting gaseous mixture is passed through the alumina particles which are maintained in the form of a fluid bed, at a temperature of 100° C. When the alumina has absorbed 5% by weight of $F^-$ anions, the connection with the Drechsel bottle is interrupted.

The alumina is heated to 120° C. for 6 hours to remove the absorbed water, and then treated, at room temperature, with a 1 N aqueous solution of sulphuric acid until it has absorbed 10% by weight of $SO_4^{--}$ anions.

The treated alumina is again dried for 6 hours at 120° C. and then calcined for 6 hours at 550° C.

The preparation of the catalytic component, by means of the impregnation of the alumina support with $TiCl_4$ is then effected as in Example 1.

The catalytic component thus prepared has a titanium content equal to 0.8% by weight with respect to the support.

The preparation of the catalytic system and the polymerization of the ethylene are then effected as in Example 1.

The productivity is 1650 g of polyethylene/g catalyst/h; the specific activity of the catalytic component is 206 Kg of polyethylene/g titanium/h.

EXAMPLE 6

200 g of alumina identical to that used in Example 4 are treated with 15 g of fluorosulphonic acid for 30 minutes, at room temperature.

The treated alumina is dried for 6 hours at 120° C. and then calcined for 12 hours at 450° C.

The support thus obtained contains 12% by weight of fluorosulphonate anion.

The preparation of the catalytic component, by means of the impregnation of the support with $TiCl_4$, is effected as in Example 1.

The catalytic component thus prepared has a titanium content equal to 1.6% by weight with respect to the support.

The preparation of the catalytic system and the polymerization of the ethylene are then effected as in Example 1.

The productivity is 1950 g of polyethylene/g catalyst/h; the specific activity of the catalytic component is 121.9 Kg of polyethylene/g titanium/h.

What we claim is:

1. In a Ziegler catalytic system formed by the combination of an organo-metallic compound of a metal of Group I, II or III of the Periodic System of the Elements according to Mendeleef and a compound of a heavy metal of Group IV, V or VI of said Periodic System supported on a carrier, the improvement which comprises: said carrier being essentially an activated amorphous alumina or alumino-silicate containing from 0.3 to 30% by weight of one or more salts of aluminum with at least one anion selected from the group consisting of the sulphate, phosphate, chlorate, perchlorate and halogen-sulphonate anions or a mixture of the latter with one or more salts of aluminum with a halogen anion, said halogen and oxygenated anions being introduced into the amorphous alumina or alumino-silicate by contacting the latter with one or more acid solutions of said inorganic anions and said alumina or alumino-silicate being then activated by calcination at a temperature of from 250° to 700° C.

2. The catalytic system of claim 1, wherein said inorganic anions are introduced in an amount ensuring in the calcined alumina or alumino-silicate an inorganic anion content of from 0.2 to 25% by weight.

3. The catalytic system of claim 2, wherein said inorganic anion content is from 1.5 to 15% by weight.

4. The catalytic system of claim 1, wherein said heavy metal is selected from the group consisting of titanium, vanadium and chromium.

5. The catalytic system of claim 1, wherein said compound of a heavy metal is selected from the group consisting of halides, oxyhalides and alkoxy halides.

6. The catalytic system of claim 1, wherein said compound of a heavy metal is titanium tetrachloride.

7. The catalytic system of claim 1, wherein said organo-metallic compound is selected from the group consisting of alkylaluminum compounds and alkylaluminum halides.

8. The catalytic system of claim 1, wherein said organo-metallic compound is selected from the group consisting of triethylaluminum and triisobutylaluminum.

* * * * *